June 25, 1940.   E. L. FIX   2,205,522
DOUBLE GLAZING UNIT
Filed Dec. 15, 1937   2 Sheets-Sheet 1
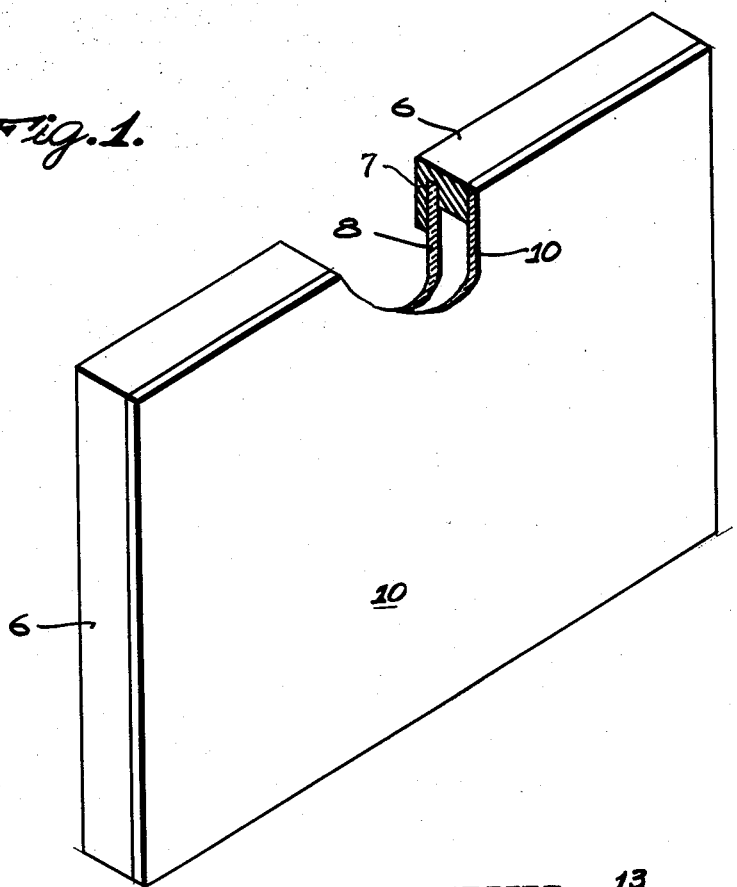
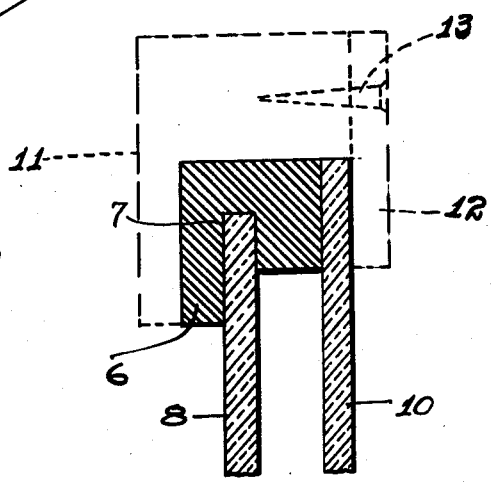
INVENTOR.
EARL L. FIX.
BY
ATTORNEYS.

June 25, 1940. E. L. FIX 2,205,522
DOUBLE GLAZING UNIT
Filed Dec. 15, 1937 2 Sheets-Sheet 2

INVENTOR.
EARL L. FIX
BY Bradley & Bee
ATTORNEYS.

Patented June 25, 1940

2,205,522

UNITED STATES PATENT OFFICE 2,205,522

DOUBLE GLAZING UNIT

Earl L. Fix, New Kensington, Pa., assignor to Pittsburgh Plate Glass Company, Allegheny County, Pa., a corporation of Pennsylvania Application December 15, 1937, Serial No. 179,820

1 Claim. (Cl. 20—56.5)

Figure 2:
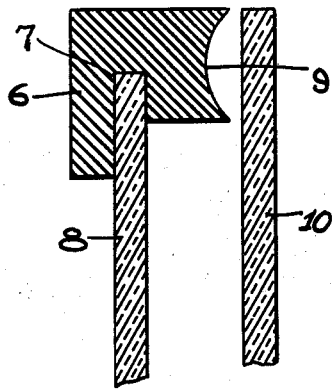
Figure 5:
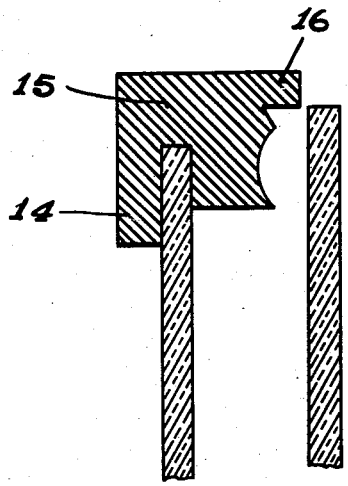
Figure 6:
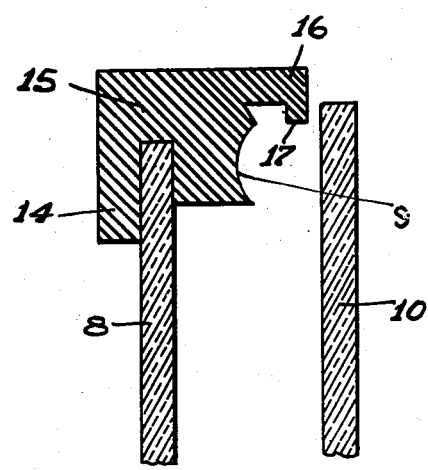

The invention relates to a double glazing unit for use in buildings, automobiles and the like. One object of the invention is the provision of a unit having a very cheap simple mounting or frame which can be made in one piece, protecting the edges of the glass plates, spacing them, and holding them securely sealed in assembled relation. A further object is the provision of a mounting permitting the ready removal of one plate to give access to the inner faces of the glass plates for cleaning purposes and for the removal of the alkaline dust which collects in the course of time on the inner faces of the plates of a double window. As applied to the windshield or other fixed window in an automobile, the construction provides for the temporary installation of one of the plates when weather conditions call for it, such plate being removed for ordinary driving conditions. Certain embodiments of the invention are illustrated in the accompanying drawings, wherein:

Figure 1 is a perspective view of the unit partially broken away at one edge. Fig. 2 is a section through the unit at one edge before the application of the outer glass plate. Fig. 3 is a similar section after the application of the outer plate, the mounting of the unit in a window sash being indicated in dotted lines. And Figs. 4, 5 and 6 are sections similar to Fig. 2 through modifications.

Referring to Figs. 1, 2 and 3, 6 is the frame of the unit, preferably of rubber having a substantial degree of resilience, although other compositions having similar characteristics may be used. This frame is preferably molded all in one piece, although it might be formed by extruding a strip of the desired cross section, four sections of which would be vulcanized together at the corners of the frame to provide a unitary structure. Extending around the inner side of the frame is a groove 7, in which the glass plate 8 is seated, the resilience of the frame being sufficient to permit the plate to be forced into position where it is securely held. The front face of the frame is provided with a concave suction recess 9 extending clear around the frame and adapted to act as a holder for the second glass plate 10. This plate 10 has the same overall dimensions as the frame so that its edges are flush with the outer faces of the frame and it is attached by pressing it against the front of the frame so as to expel the air from the recess, atmospheric pressure then serving to hold the plate securely in position. The dotted lines in Fig. 3 indicate one method of mounting the frame in a sash. The sash 11 is rabbeted so as to receive the unit and after the unit is positioned, it is held in position by strips 12 which are clamped to the sash 11 by means of the screws 13 or other suitable means.

The mounting as described above gives a very secure supporting of the outer plate 10 due to the vacuum engagement, and when clamped in position a very good seal between the face of the frame and the edge of the plate is insured. The rabbet in which the frame is seated is of such depth that when the strip 12 is applied, the frame is placed under compression. When it is desired to clean the inner faces of the plates, this is easily accomplished by removing the strips 12 and releasing the plate from its engagement with the suction recess 9. The frame may be also mounted without the use of the clamping strips 12 when it is desired to have the plate 10 in position only temporarily. For instance, as applied to a windshield, the plate 10 may be used only in very cold weather to avoid frosting, and in that case, the holding strip 12 may be dispensed with as the vacuum support will maintain the sheet securely in position for considerable periods. Under ordinary driving conditions, the plate 10 would be removed leaving only the single sheet 8. If desired, the security of the support under these conditions may be improved by the use of a thin layer of cement on the face of the recess 9.

Figure 4:
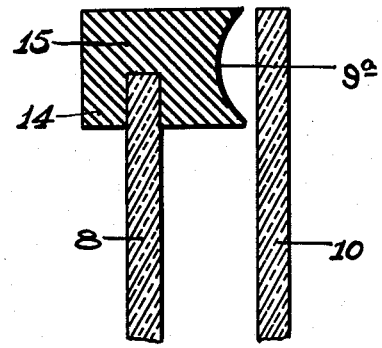

Fig. 4 illustrates a modification in which the overlap 14 on the inner side of the plate 8 is less than in the Fig. 1 construction, the frame 15 in this case being thus made more nearly rectangular so that it is somewhat easier to mold or extrude. The cement layer 9a is shown as applied in this construction.

The Fig. 5 construction differs from that of Figs. 1 to 3 in that the frame is provided with a projecting ledge or shoulder 16 which fits the edge of the plate 10 snugly when such plate is pushed in against the walls of the vacuum recess 9. This gives a positive support by the frame itself against any edgewise movement of the plate 10 and reduces the danger of the plate 10 being dislodged from position due to vibration when held only by the suction device. Various other modifications in the shape of the frame member may be made to meet special conditions, the only requirement being that the frame be of resilient material grooved to receive the plate 8 and that it have the vacuum recess extending around the face of the frame for holding the second sheet 10, either temporarily or permanently in position.

In the construction of Fig. 6, a small retaining lip 17 is provided on the shoulder 16 past which the plate 10 is easily pressed in making the assembly. This prevents the accidental displacement of the plate, in case the vacuum recess loses its grip upon the glass. This construction and that of Fig. 5, as applied to an automobile windshield insure a secure mounting of the outer plate 10, as the air pressure upon the plate due to the motion of the car serves to automatically reestablish the suction grip of the recess 9 when this becomes loosened by leakage. This security is further increased in the inclined windshield now commonly used.

I am aware that heretofore, suction edge devices have been used to hold anti-frost panes to the inner faces of windshields to give clear vision for the driver, but such devices are of relatively small size supported by the windshield glass itself, and afford only limited insulating value to the shield as a whole, as opposed to the present construction, in which the second pane is carried by the rubber frame which acts as a spacing and sealing means for both sheets and gives the same insulating effect as a standard double glazed unit without any obstruction to vision, such as occurs with the frame of the anti-frost devices, heretofore used

What I claim is:

A double glazed unit comprising a unitary frame of resilient material having on its inner side a groove for receiving one of the glass plates of the unit and having the face of the frame remote from said groove provided with a concave suction recess extending around the frame, a shoulder on the frame outward from said recess and also extending around the frame, a retaining lip on the shoulder projecting inward in opposition to the recess, a glass plate seated in said groove, and a second glass plate overlying the suction recess and fitting inside said shoulder inward of the retaining lip, said plate being held in place by atmospheric pressure incident to pressing the second plate into position and expelling the air from the recess.

EARL L. FIX.